(12) United States Patent
Kuehne et al.

(10) Patent No.: US 11,759,873 B2
(45) Date of Patent: Sep. 19, 2023

(54) RECIPROCATING SAW

(71) Applicant: Black & Decker Inc., New Britain, CT (US)

(72) Inventors: Brent A. Kuehne, Red Lion, PA (US); Ning Wu, Suzhou (CN)

(73) Assignee: BLACK & DECKER INC., New Britain, CT (US)

(*) Notice: Subject to any disclaimer, the term of this patent is extended or adjusted under 35 U.S.C. 154(b) by 0 days.

(21) Appl. No.: 17/872,615

(22) Filed: Jul. 25, 2022

(65) Prior Publication Data

US 2022/0355400 A1 Nov. 10, 2022

Related U.S. Application Data

(63) Continuation of application No. 16/895,514, filed on Jun. 8, 2020.

(60) Provisional application No. 62/860,414, filed on Jun. 12, 2019.

(51) Int. Cl.
*B23D 49/16* (2006.01)
*B23D 51/10* (2006.01)
*F16H 57/031* (2012.01)

(52) U.S. Cl.
CPC .......... *B23D 49/162* (2013.01); *B23D 51/10* (2013.01); *F16H 57/031* (2013.01)

(58) Field of Classification Search
CPC ...... B23D 49/162; B23D 51/10; B23D 51/02; B23D 51/16; B23D 49/16; B23D 51/20; B23D 49/165; F16H 57/031; B27B 3/26; B27B 19/09; B25F 5/006; B25F 5/00; F16J 15/3232

USPC ........ 30/392, 393, 394; 83/169; 92/164, 168
See application file for complete search history.

(56) References Cited

U.S. PATENT DOCUMENTS

| | | | |
|---|---|---|---|
| 2,639,737 A | 5/1953 | Forsberg | |
| 2,704,941 A | 3/1955 | Holford | |
| 4,238,884 A | 12/1980 | Walton, II | |
| 4,474,077 A * | 10/1984 | Debelius | F16H 57/032 29/451 |
| 4,489,724 A | 12/1984 | Arnegger | |
| 5,079,844 A | 1/1992 | Palm | |
| 6,209,208 B1 | 4/2001 | Marinkovich et al. | |
| 6,226,877 B1 | 5/2001 | Ono | |
| 6,568,089 B1 | 5/2003 | Popik et al. | |
| 6,725,548 B1 | 4/2004 | Kramer et al. | |

(Continued)

FOREIGN PATENT DOCUMENTS

| | | |
|---|---|---|
| DE | 19804706 A1 | 8/1998 |
| DE | 29905088 U1 | 8/1999 |

(Continued)

OTHER PUBLICATIONS

Prior art DeWalt DCS367 reciprocating saw gearcase assembly.

(Continued)

*Primary Examiner* — Ghassem Alie
(74) *Attorney, Agent, or Firm* — Michael Aronoff

(57) ABSTRACT

A method of assembling a gearcase cover assembly of a reciprocating saw. The method includes providing a gearcase cover with a cylindrical opening and a receiving portion, providing a shaft with a yoke affixed to the shaft, inserting a first end of the shaft into the cylindrical opening and rotating the shaft such that a second end of the shaft sits in the receiving portion.

9 Claims, 16 Drawing Sheets

(56) References Cited

U.S. PATENT DOCUMENTS

| | | | |
|---|---|---|---|
| 7,040,023 B2 | 5/2006 | Nemazi et al. | |
| 7,107,690 B2 | 9/2006 | Lui et al. | |
| 7,871,080 B2 | 1/2011 | Marini et al. | |
| 8,024,865 B2 | 9/2011 | Kaiser et al. | |
| 8,082,671 B2 | 12/2011 | Saegesser | |
| 8,166,660 B2 | 5/2012 | Zhou | |
| 8,181,973 B2 | 5/2012 | Dezheng et al. | |
| 8,272,135 B2 | 9/2012 | Zhou | |
| 8,307,910 B2 | 11/2012 | Holmes et al. | |
| 8,393,625 B2 | 3/2013 | Marini et al. | |
| 8,641,049 B2 | 2/2014 | Marini et al. | |
| 9,038,278 B2 | 5/2015 | Kani et al. | |
| 9,156,097 B2 | 10/2015 | Neitzell et al. | |
| 9,232,949 B2 | 1/2016 | Carusillo et al. | |
| 9,572,585 B2 | 2/2017 | Carusillo | |
| 9,579,735 B2 | 2/2017 | Wattenbach et al. | |
| 9,744,605 B2 | 8/2017 | Wang | |
| 2005/0239591 A1 | 10/2005 | Schoenek et al. | |
| 2006/0260141 A1 | 11/2006 | Phillips et al. | |
| 2016/0303668 A1* | 10/2016 | Sugino | B23D 51/16 |
| 2017/0129026 A1 | 5/2017 | Wattenbach et al. | |
| 2017/0361386 A1 | 12/2017 | Lu | |
| 2018/0126470 A1 | 5/2018 | Banholzer | |
| 2020/0094432 A1 | 3/2020 | Monzen et al. | |

FOREIGN PATENT DOCUMENTS

| | | |
|---|---|---|
| DE | 10392725 T5 | 8/2005 |
| DE | 102007026444 A1 | 12/2008 |
| DE | 10123534 B4 | 2/2015 |
| EP | 0970771 A2 | 1/2000 |
| EP | 1188505 A2 | 3/2002 |
| EP | 1236530 B1 | 7/2005 |
| EP | 1600234 A1 | 11/2005 |
| EP | 1661652 A1 | 5/2006 |
| EP | 1555078 B1 | 12/2007 |
| EP | 2131981 A1 | 12/2009 |
| EP | 1422009 B1 | 6/2011 |
| EP | 1857210 B1 | 11/2012 |
| EP | 2641685 B1 | 7/2015 |
| EP | 2554314 B1 | 12/2016 |
| EP | 3147058 A1 | 3/2017 |
| GB | 2398540 A | 8/2004 |
| GB | 2418393 B | 11/2006 |
| GB | 2454175 B | 3/2010 |
| GB | 2463539 A | 3/2010 |
| GB | 2445843 B | 2/2011 |
| GB | 2480527 B | 8/2014 |
| WO | 9527583 A1 | 10/1995 |
| WO | 9731745 A2 | 9/1997 |

OTHER PUBLICATIONS

Prior art Craftsman CMCS300 reciprocating saw gearcase assembly.

Extended European Search Report, EP Application No. 20179469, dated Nov. 4, 2020, 9 pages, EPO.

* cited by examiner

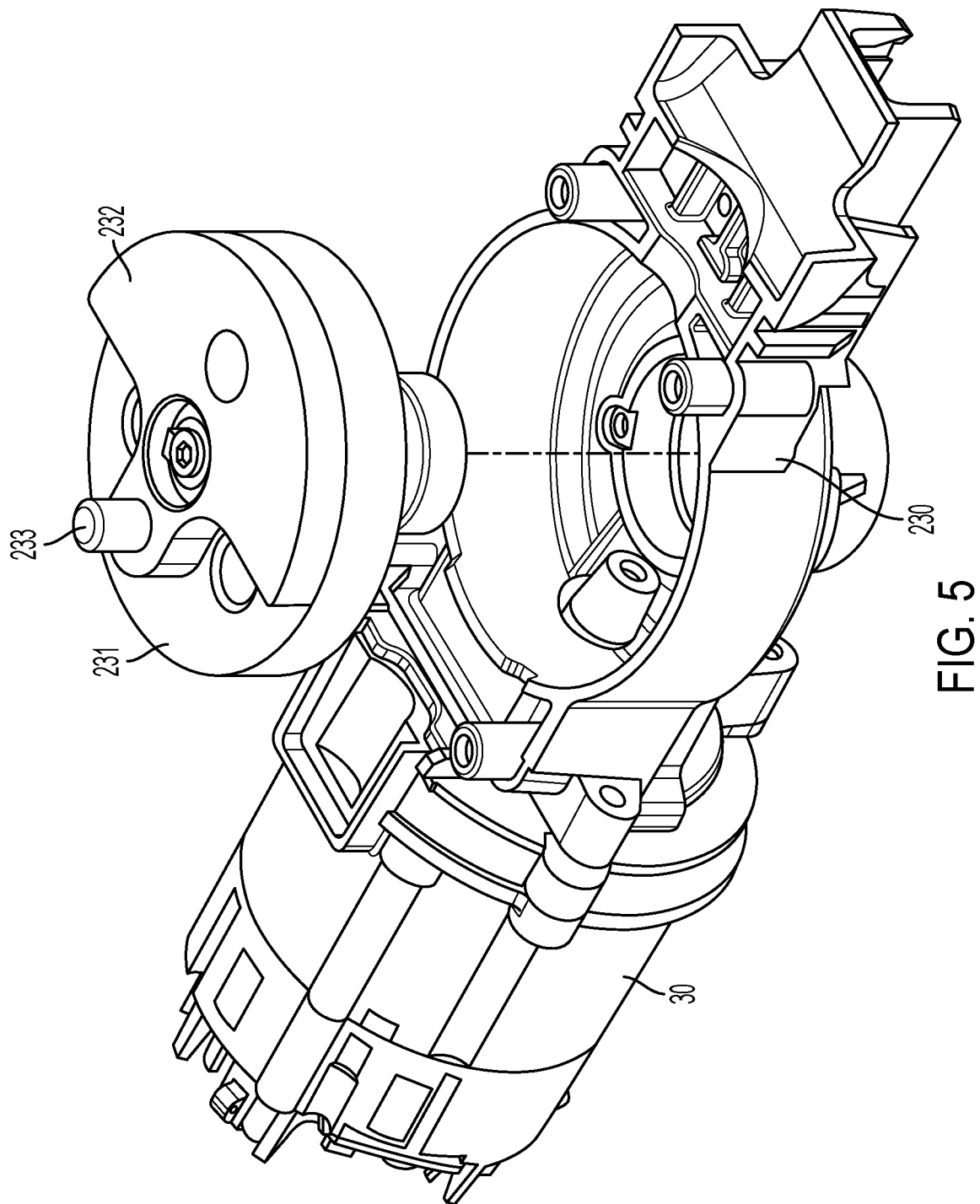

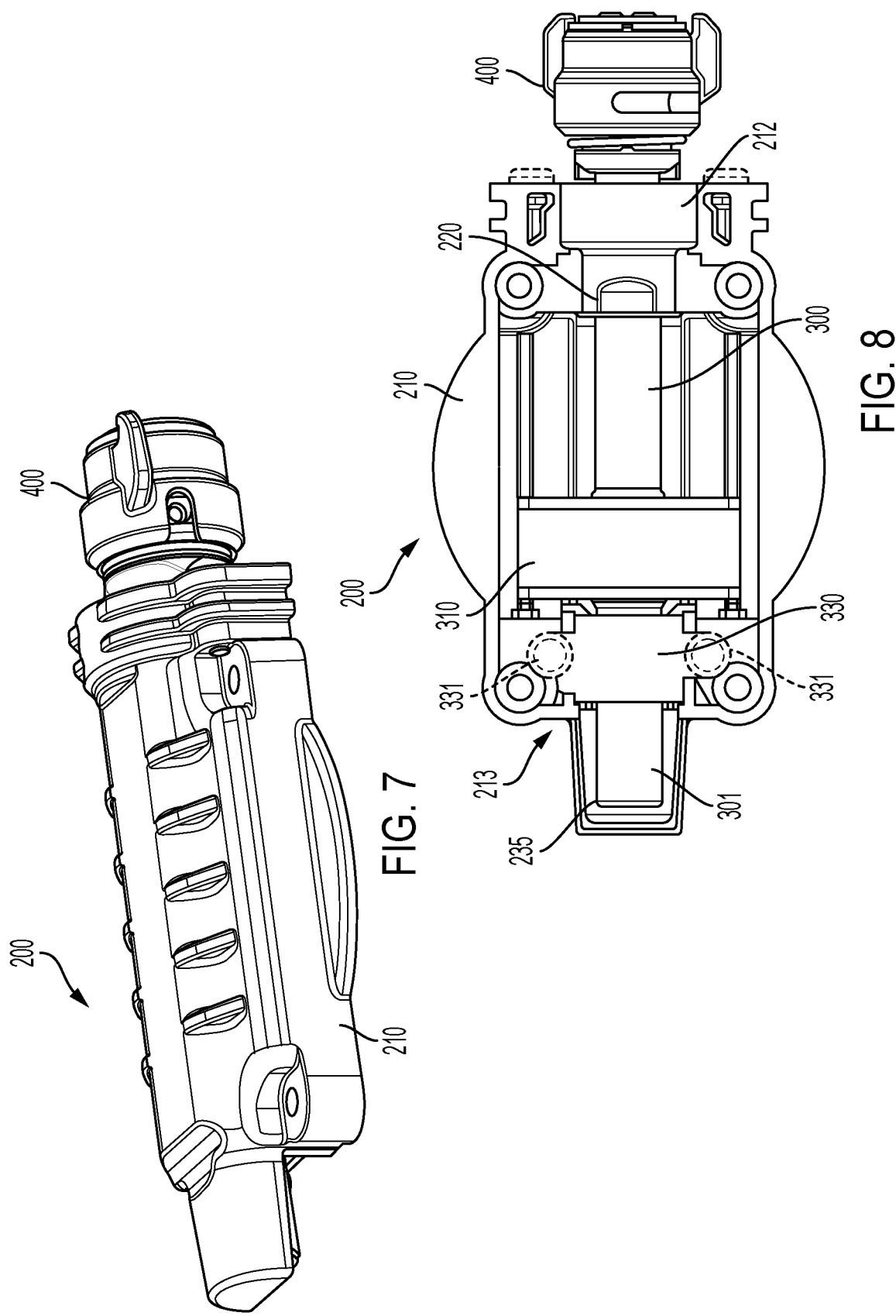

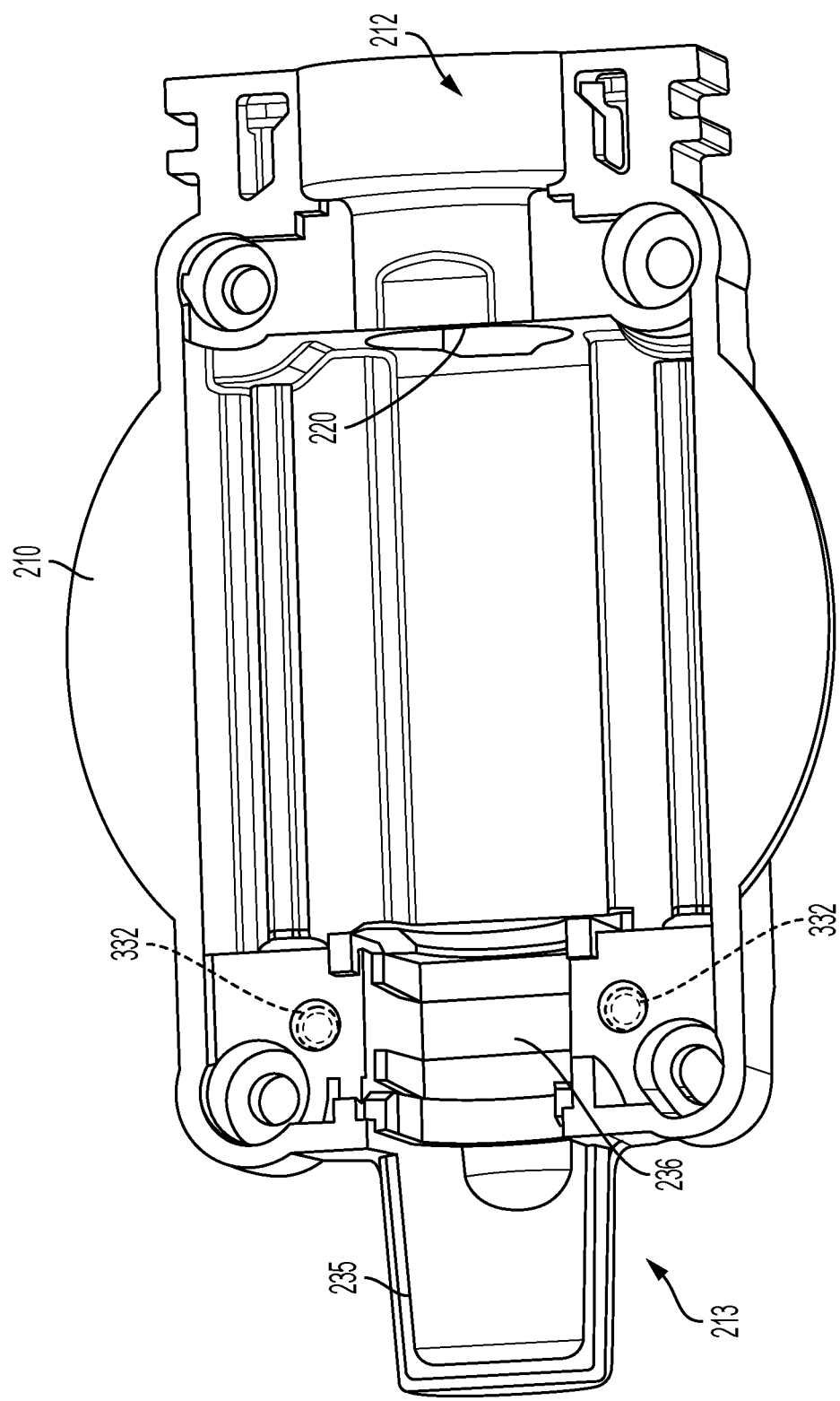

RECIPROCATING SAW

CROSS-REFERENCE TO RELATED APPLICATION

This application is a continuation of U.S. patent application Ser. No. 16/895,514, filed on Jun. 8, 2020, which claims priority and benefit to U.S. Provisional Application No. 62/860,414, filed on Jun. 12, 2019, the entire contents of both are incorporated herein by reference in their entireties.

FIELD OF THE INVENTION

The present disclosure relates to a reciprocating saw and components, assemblies and methods of assembling the components. This may include a gearcase for a reciprocating saw and a method of assembling a reciprocating saw in a gearcase.

BACKGROUND OF THE INVENTION

In the DeWALT DCS367 reciprocating saw, the gearcase assembly requires sliding the shaft into the gearcase and assembling a yoke channel with screws after the shaft has been slid into the gearcase.

In the Craftsman CMCS300 reciprocating saw, the yoke channel may be attached to the shaft before the shaft is inserted into the gearcase. However, the assembly relies upon two screwed on covers to secure the shaft in place. This may allow dust and debris into an end near the blade clamp and may also provide weak points.

According to a non-limiting aspect of the present application, it is desired to provide a gearcase and shaft assembly that is both strong and easy to assemble.

SUMMARY OF EMBODIMENTS OF THE INVENTION

Aspects of the present disclosure relate to a reciprocating saw, a gearcase cover, a gearcase cover assembly a gearcase assembly and methods and components related thereto.

According to one aspect there is an exemplary embodiment of a method of assembling a gearcase. A method of assembling a gearcase cover assembly of a reciprocating saw, the method including providing a gearcase cover with a cylindrical opening and a receiving portion; providing a shaft with a yoke affixed to the shaft; inserting a first end of the shaft into the cylindrical opening; and rotating the shaft such that a second end of the shaft sits in the receiving portion.

The shaft further may further include a bearing affixed thereto.

The gearcase cover may include a bearing receiving portion.

The rotating the shaft may include rotating the shaft such that the bearing sits in the bearing receiving portion.

The method may further include securing a bearing cover to the gearcase cover.

The method may further comprise securing the bearing cover to the gearcase cover causes the shaft to be secured in the gearcase cover.

The bearing cover may secure the bearing in the bearing receiving portion.

The method may further include assembling a blade clamp assembly to the first end of the shaft.

According to another aspect, there is exemplary embodiment of a reciprocating saw which includes a gearcase cover; and a shaft connected to the gearcase cover. The gearcase cover may be integrally formed to include a first end including a cylindrical tube and a second end including a receiving portion with an open portion opposite the receiving portion.

The gearcase cover may be integrally formed via casting.

The gearcase cover may be an integrally formed aluminum cast.

The reciprocating saw may further include a securing cover at or adjacent to the open portion.

The securing cover may be secured to the gearcase cover to secure the shaft in the gearcase cover.

The securing cover may be secured to the gearcase cover via screws.

The reciprocating saw may further include a yoke on the shaft.

The yoke may be welded to the shaft.

According to another aspect, there is an exemplary embodiment of a reciprocating saw including a housing; a motor housed in the housing; a user-operable trigger configured to operate the motor; a blade clamp driven by the motor through a reciprocating shaft; and a gearcase adjacent to the motor. The gearcase includes a base and a gearcase cover. The gearcase houses the shaft, a track roller bearing, a counterbalance and a pin that rotates with the track roller bearing. The gearcase cover is integrally formed to include a first end including a cylindrical tube and a second end including a receiving portion with an open portion opposite the receiving portion.

The gearcase cover may be integrally formed via casting.

The gearcase cover may be an integrally formed aluminum cast.

The reciprocating saw may further include a securing cover at or adjacent to the open portion.

The securing cover may be secured to the gearcase cover.

The securing cover may be secured to the gearcase cover via screws.

The reciprocating saw may further include a yoke on the shaft.

The yoke may be welded to the shaft.

According to another aspect, there is an exemplary embodiment of a reciprocating saw including a gearcase assembly. The gearcase assembly includes a gearcase cover and a reciprocating shaft. The reciprocating shaft is secured to the gearcase cover in at least two locations along the reciprocating shaft. In a first location the reciprocating shaft is secured by a securing plate. In the second location the reciprocating shaft is secured through a cylindrical opening in the gearcase cover. The gearcase cover may be a single integrally made piece, such as a metal casting. The metal casting may be an aluminum casting.

According to another aspect, there is an exemplary embodiment of a method of assembly for a reciprocating saw. The method may include forming a gearcase cover with an open end and a closed end; providing a shaft with a yoke channel; inserting a first end of the shaft into the closed end of the gearcase cover; and rotating the shaft so that a second end of the shaft fits into the open end of the gearcase cover.

The yoke channel may be welded onto the shaft.

The method may further comprise securing a securing cover to the gearcase cover to secure the shaft in the gearcase cover.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

All closed-ended (e.g., between A and B) and open-ended (greater than C) ranges of values disclosed herein explicitly include all ranges that fall within or nest within such ranges. For example, a disclosed range of 1-10 is understood as also disclosing, among other ranged, 2-10, 1-9, 3-9, etc.

BRIEF DESCRIPTION OF THE DRAWINGS

For a better understanding of embodiments of the present invention as well as other objects and further features thereof, reference is made to the following description which is to be used in conjunction with the accompanying drawings, where:

FIG. 5 is a perspective view of a motor, gearcase base and internals of the exemplary embodiment;

FIG. 7 is a perspective view of a gearcase cover assembly of the exemplary embodiment;

FIG. 8 is another view of the gearcase cover assembly of the exemplary embodiment;

FIG. 9 is a perspective view of a gearcase cover of the exemplary embodiment;

DETAILED DESCRIPTION OF EXEMPLARY EMBODIMENTS OF THE INVENTION

Figure 1:
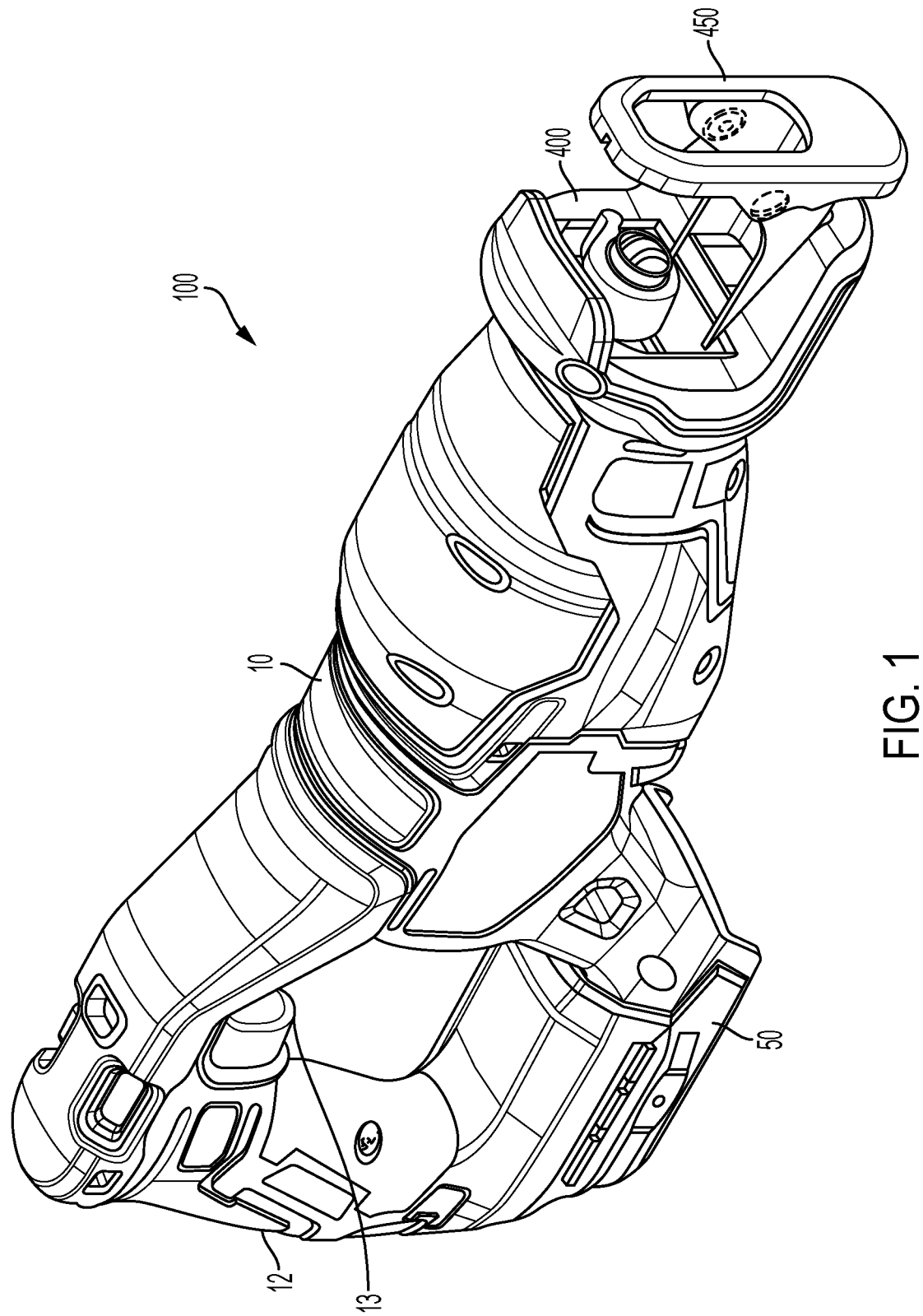
FIG. 1 is a perspective view of a reciprocating saw according to an exemplary embodiment of the present application.

FIG. 1 illustrates a reciprocating saw 100 according to an exemplary embodiment of the present application. The reciprocating saw 100 includes a housing 10. The reciprocating saw further includes a handle 12 to be gripped by a user. A battery receptacle 50 receives a battery pack for powering the reciprocating saw 100. The battery pack (not shown) may be a power tool battery pack which can provide power for a number of different power tools in a power tool system. The battery pack may be a lithium-ion slide pack or another type of power tool battery pack.

A trigger 13 is located on the handle 12 and depressing the switch causes the reciprocating saw 100 to operate. The trigger 13 may have a lock-off feature. It may also be a variable speed switch or have various variable speed controls. At a front of the reciprocating saw 100 there is a blade clamp 400. The blade clamp 400 is configured to hold a reciprocating saw blade, for example, such as the blade shown in U.S. Pat. No. 8,210,081, which is hereby incorporated by reference in its entirety. The reciprocating saw 100 also includes a shoe 450 to assist with guiding and cutting.

Figure 2:
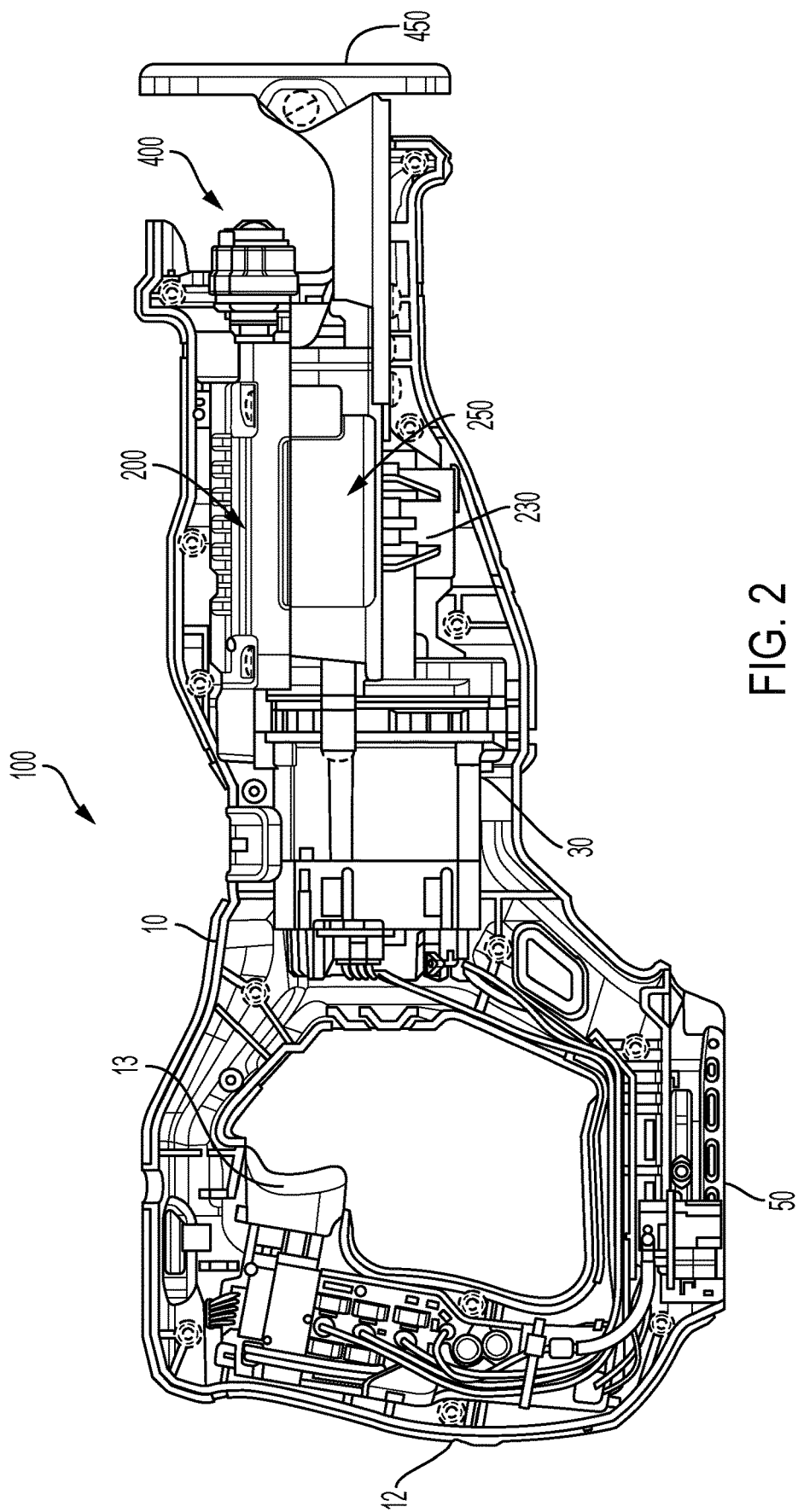
FIG. 2 is a cut-away side view of the exemplary embodiment of the reciprocating saw.

FIG. 2 is a side view of the reciprocating saw 100 with part of the housing 10 removed so that the internals are visible. As shown, the reciprocating saw 100 includes a motor 30. The motor 30 drives the blade clamp 400 through a reciprocating saw shaft 300, discussed below. As also shown in FIG. 2, the housing holds a gearcase 250 which includes a gearcase cover assembly 200 and a base 230.

Figure 4:
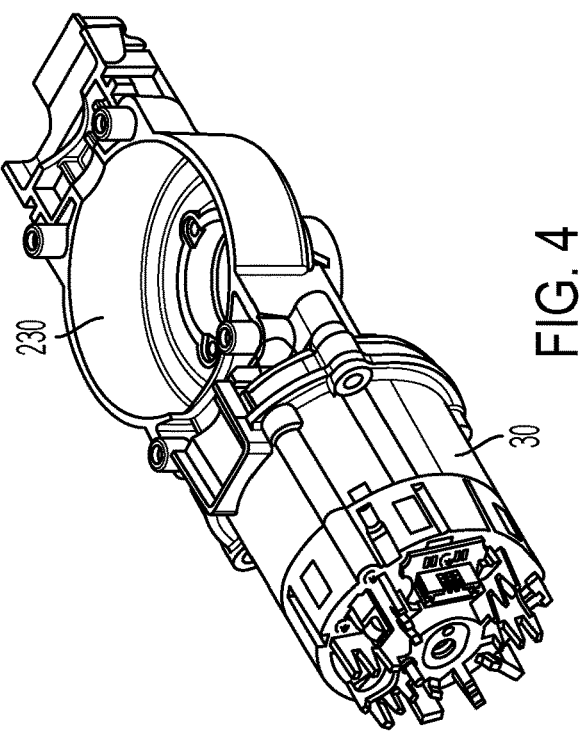
FIG. 4 is another perspective view of a motor and gearcase base of the exemplary embodiment.
Figure 3:
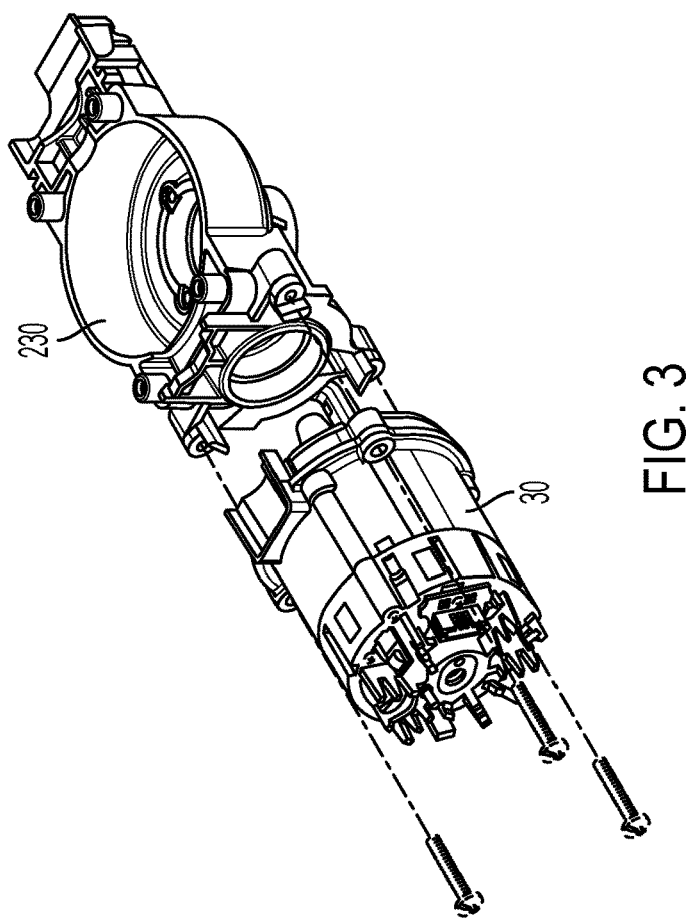
FIG. 3 is a perspective view of a motor and gearcase base of the exemplary embodiment.

FIGS. 3 and 4 show perspective views of the motor 30 and gearcase base 230. FIG. 3 is an exploded view of the motor 30 and base 230 and FIG. 3 shows the motor 30 and base 230 assembled with one another.

Figure 6:
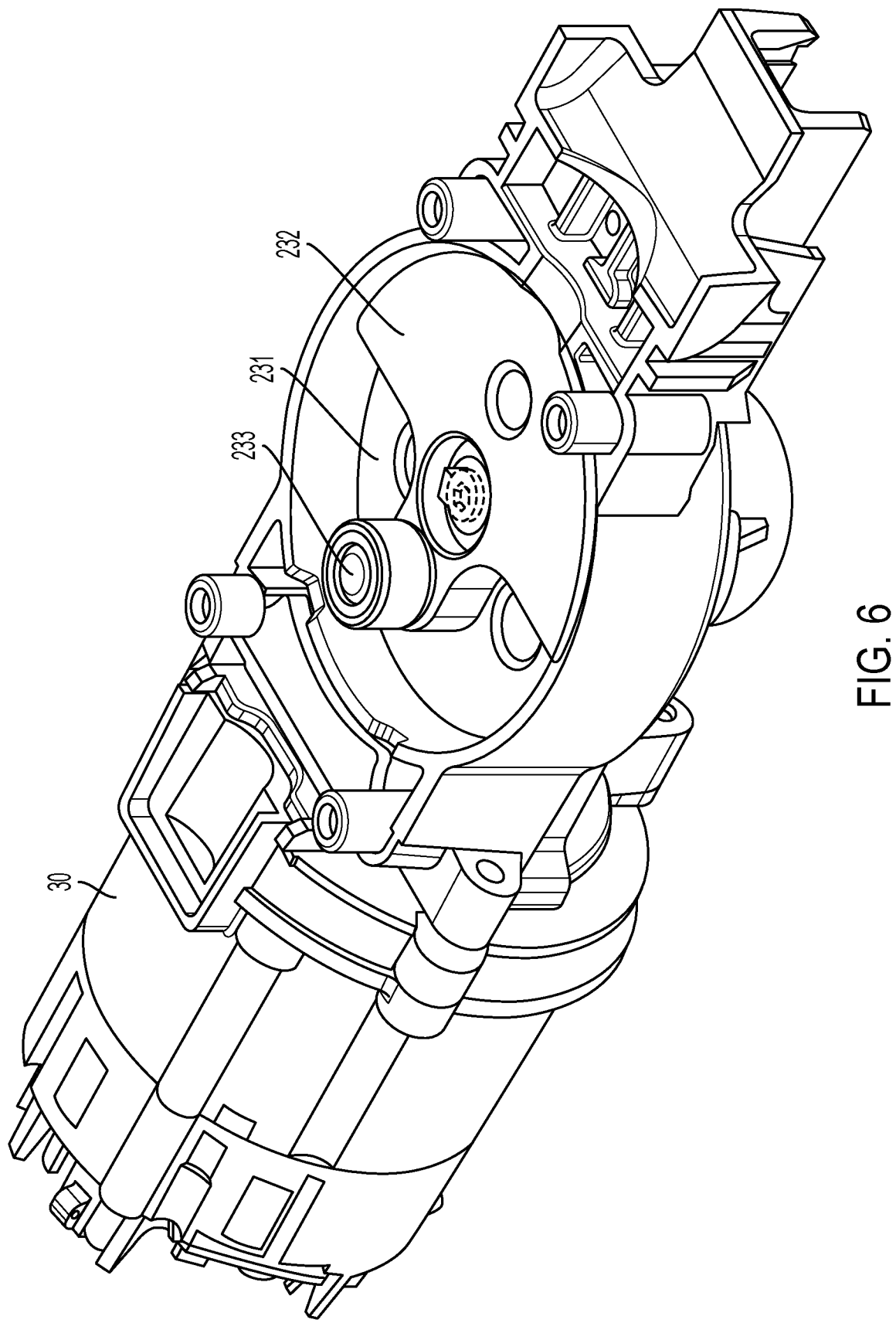
FIG. 6 is another perspective view of a motor, gearcase base and internals of the exemplary embodiment.

FIGS. 5 and 6 illustrates a track roller bearing 231, a counter balance 232, and a pin 233 along with the motor 30 and base 230. FIG. 5 illustrates an exploded view and FIG. 6 illustrates the assembled view. The track roller bearing 231 is driven by the motor 30 so that the track roller bearing 231 rotates. The pin 233 is connected to the track roller bearing 231 so that the pin 233 rotates along with the track roller bearing 231. The counter balance 232 helps to minimize vibration during use.

FIGS. 7-14 illustrate the gearcase cover assembly 200. The gearcase cover assembly includes a gearcase cover 210. The gearcase cover 210 is shown by itself in FIG. 9. The gearcase cover 210 includes a cylindrical opening 220 through which the shaft 300 can project. Additionally, it has a rear receiving portion 235 which receives a rear end of the shaft 300 and a rear bearing receiving portion 236 which holds a rear bearing 320.

Figure 10:
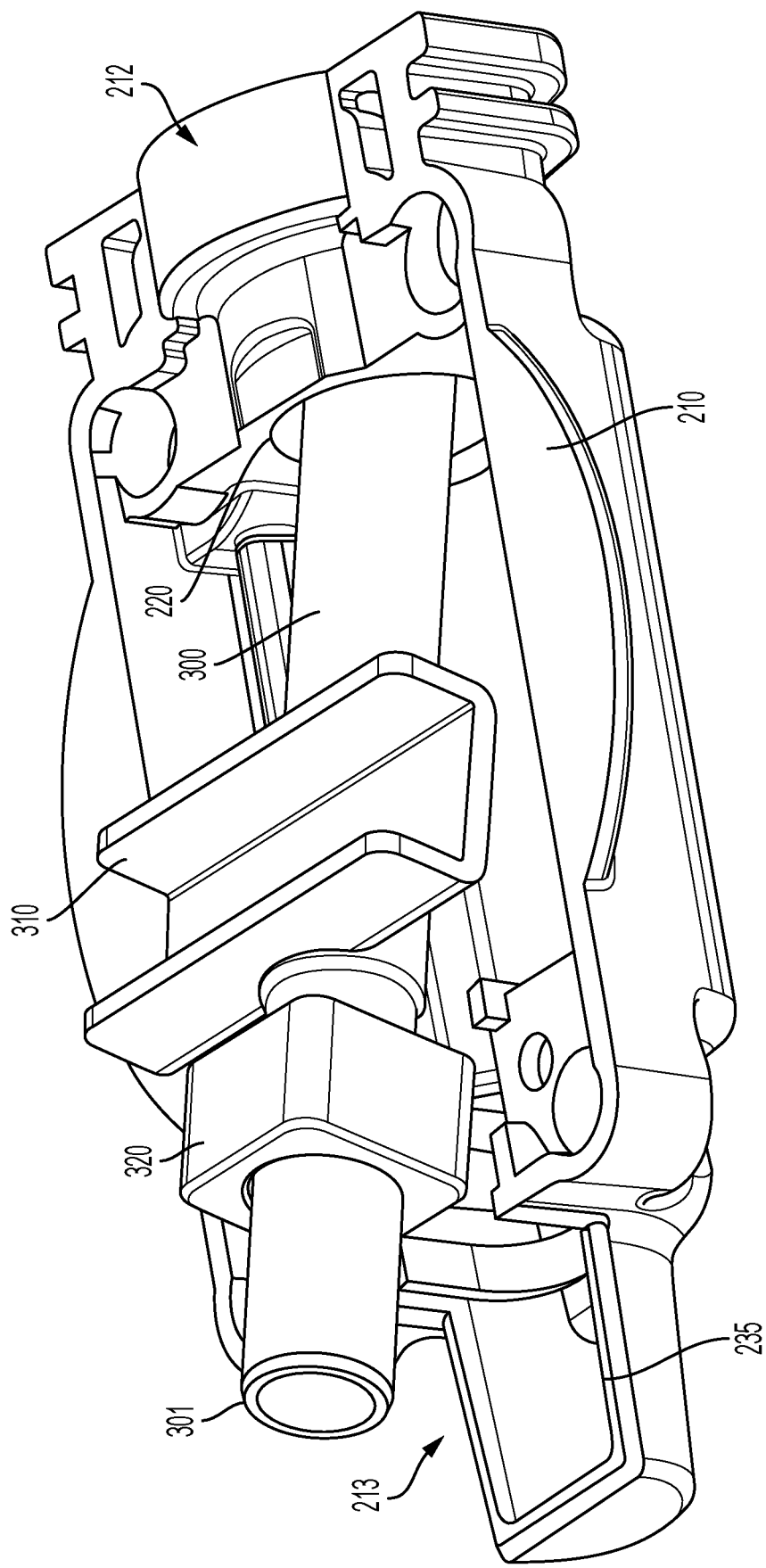
FIG. 10 is a perspective view of an assembly step of the gearcase assembly of the exemplary embodiment.
Figure 11:
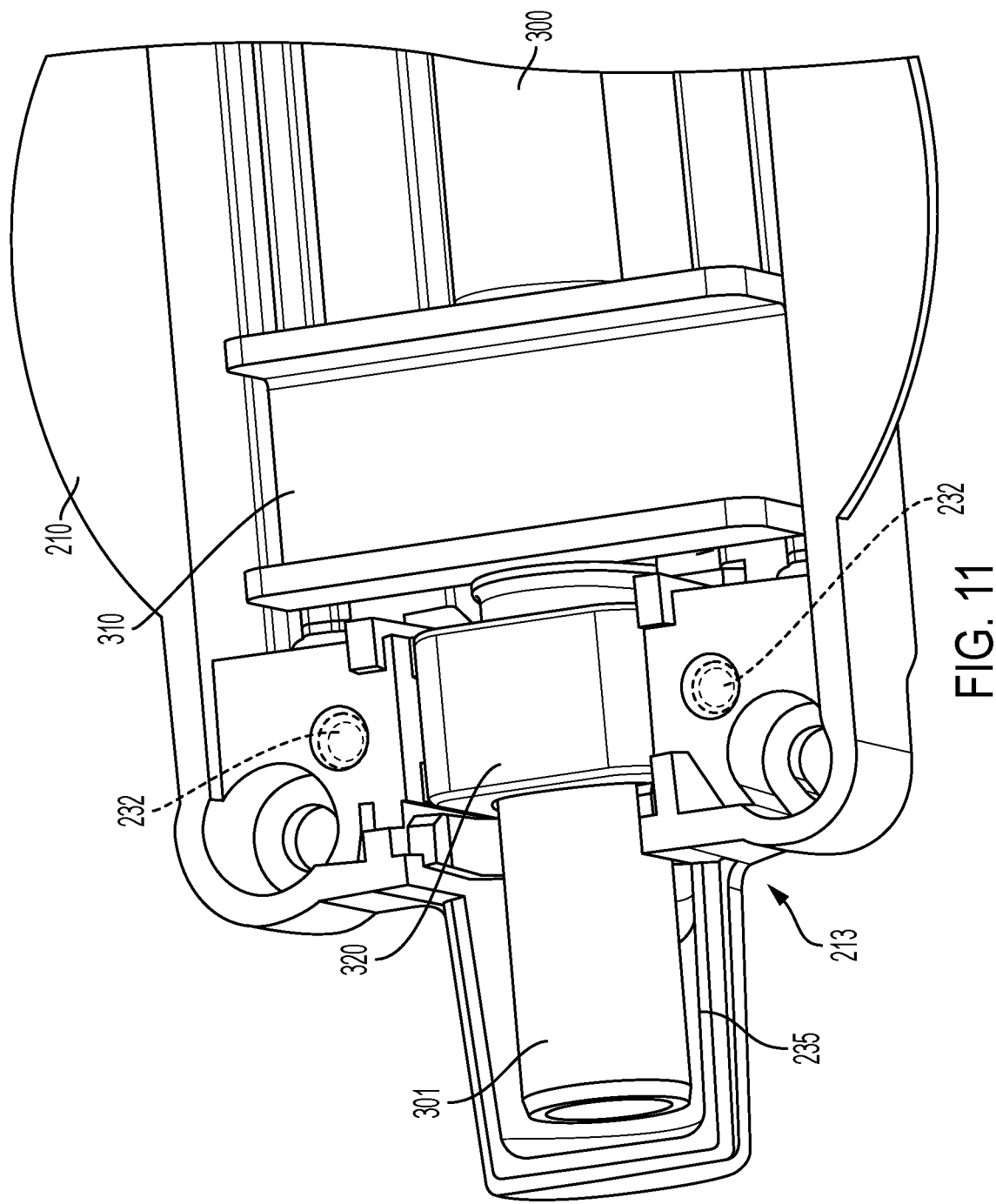
FIG. 11 is a close up view of a portion of the gearcase assembly of the exemplary embodiment.
Figure 12:
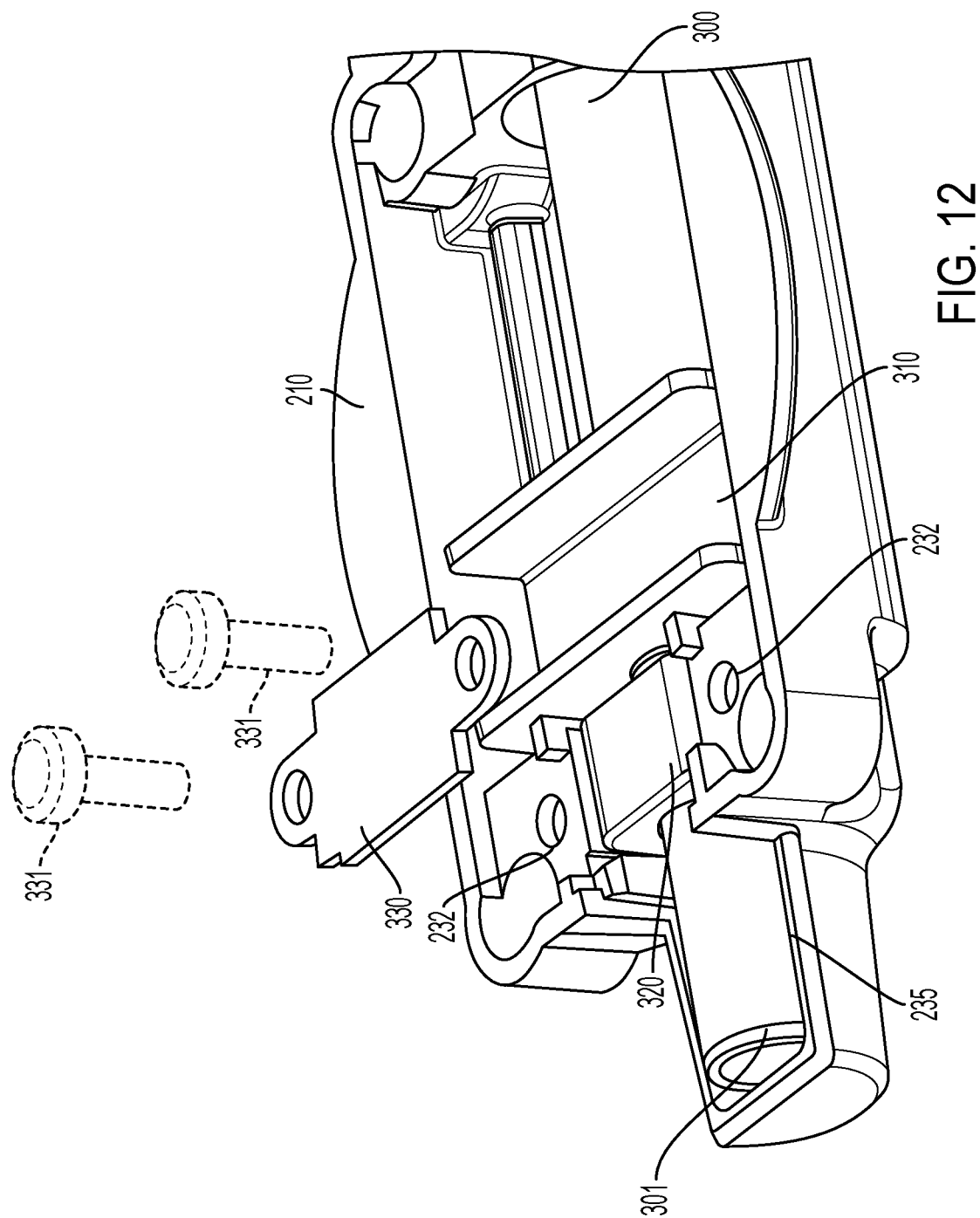
FIG. 12 is a close up view of a portion of the gearcase assembly of the exemplary embodiment during a step of assembly.

As shown in FIGS. 7 and 8, the blade clamp 400 projects out of a front of the gear case cover 210. As shown in FIGS. 8 and 10-12, a rear end 301 of the shaft 300 fits into the rear receiving portion 235 of the cover 210. As shown in FIGS. 10-12, the rear bearing 320 fits into the rear bearing receiving portion 236. The bearing cover 330 fits over the rear receiving portion 235 to hold the rear bearing 320 in the cover 210. The cover 210 includes screw holes 332 and screws 331 secure the bearing cover 330 in place. The bearing cover 330 secures the rear bearing 320 in place and thus also secures the shaft 300 in place, and the bearing cover 330 may also be referred to as a securing cover or plate.

Figure 19:
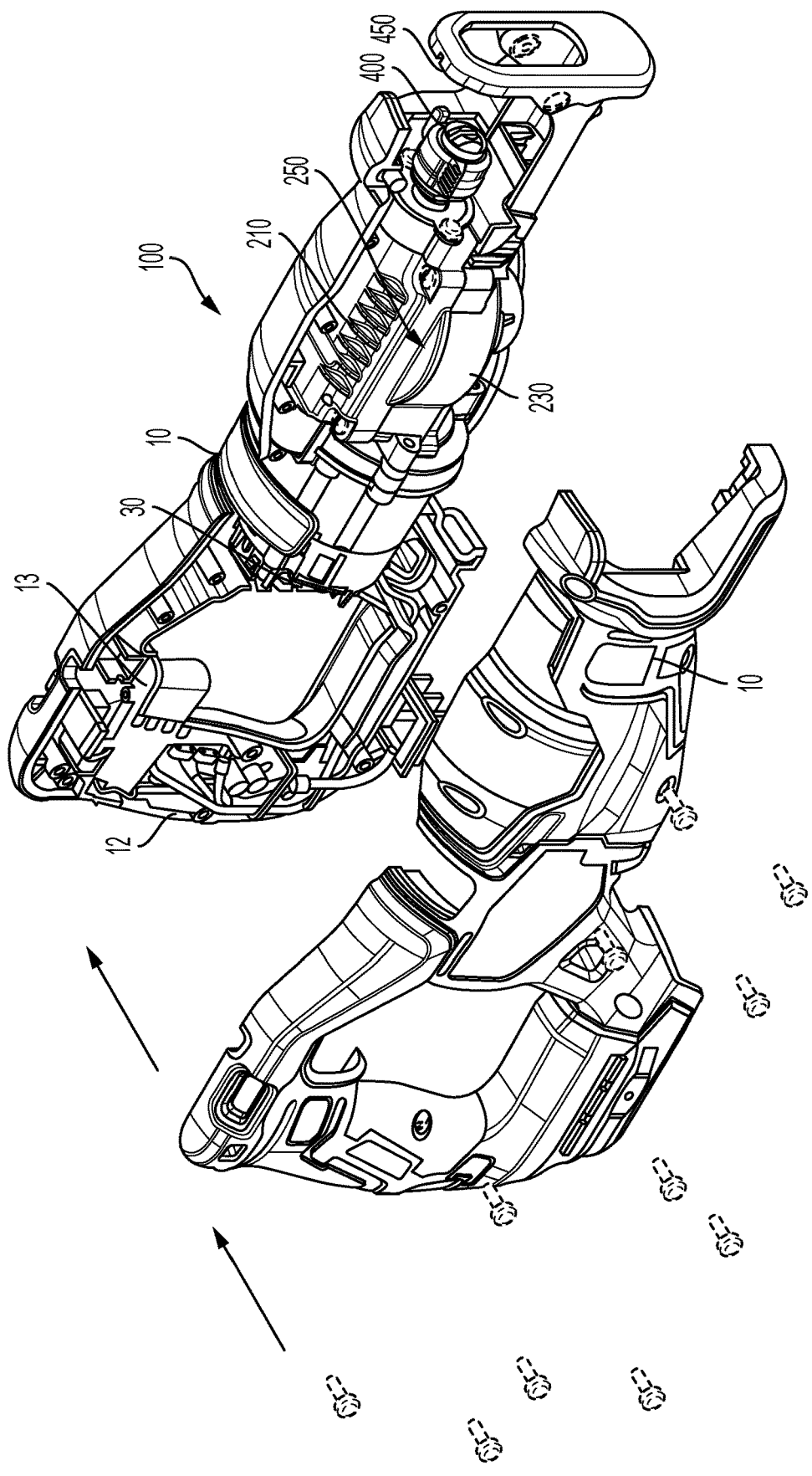
FIG. 19 is a perspective view of the housing of the reciprocating saw of the exemplary embodiment being assembled.

The cover assembly 200 of FIGS. 7 and 8 is attached to the base 230 and motor 30 assembly shown in FIG. 6, as shown in FIGS. 2 and 19. When assembled, the pin 233 engages yoke 310 that is fixed to the shaft 300. When the pin 233 rotates, the yoke (or yoke channel) 310 is correspondingly moved forward and backwards. Since the shaft 300 is connected to the yoke 310 and the blade clamp 400 to the shaft 300, the shaft 300 and blade clamp 400 also move forward and backward in a reciprocal motion. A blade held by the blade clamp 400 thus also moves in a reciprocating motion and can cut a workpiece such as a piece of wood or a pipe.

FIG. 9 illustrates the gearcase cover 210 alone. The gearcase cover 210 is formed integrally as a single piece. The gearcase cover 210 may be made of metal, for example aluminum. Additionally, the gearcase cover 210 may be made by casting. According to the exemplary embodiment, the gearcase cover 210 is an aluminum casting formed as a single piece.

As is shown in FIG. 9, a forward end 212 of the gearcase cover 210 includes the cylindrical opening 220. The cylindrical opening 220 creates a cylindrical tube in the gearcase cover 210 through which the shaft 300 is inserted and extends. This cylindrical tube prevents radial translation of the shaft 300. That is, the shaft 300 may rotate about its axis. Additionally, the shaft 300 may move axially forward or rearward until it is secured in those directions. However, the cylindrical tube prevents radial translation of the shaft (i.e., the direction out of the page in FIG. 8).

As also shown in FIG. 9, in contrast to the forward end 212, at the rear end 213 of the front cover 210, the cover 210 is open. Accordingly, as is shown in FIG. 10, the shaft 300 with the yoke 310 and bearing 320 can be rotated towards the cover 210 into place. In particular, the shaft 300 may be rotated from the position in FIG. 10 to the position in FIG. 11. During this rotation, the shaft 300 may move further into or out of the cylindrical opening 220, though typically the shaft would move further into the cylindrical opening 220 if there is any such movement.

As is shown in FIG. 11, the rear end 301 of the shaft 300 and the bearing 320 and yoke 310 are not secured until the bearing cover 330 is secured in place with screws 331. Accordingly, the gearcase cover 210 can be considered closed at the forward end 212 and open at and adjacent to the rear end 213.

Having the closed forward end 212 provides structural strength. The cast aluminum tube provides greater strength than the bearing cover 330. Additionally, the cast aluminum cylindrical tube may prevent dust or debris from entering the area. This may be important at the forward end as it is closest to the blade clamp 400 which will hold a reciprocating saw blade for cutting. There may be significant forces on this area of the shaft 300 as the shaft 330 reciprocates. Additionally, any dust or debris may interfere with reciprocation of the shaft 300.

The open end near the rear end 213 allows for ease of assembly. In particular, it allows for the yoke 310 to be attached to the shaft 300 (such as by welding) before the shaft 300 is assembled into the gearcase cover 210. Similarly, it allows the rear bearing 320 to be assembled onto the shaft 300 before the shaft is assembled into the gearcase cover 210. In the prior art, the gearcase covers included either two closed portions which required a sliding shaft assembly and that the yoke be secured to the shaft after the shaft was assembled to a gearcase cover; or two open portions which did not provide for the structural strength provided by the cylindrical tube of the exemplary embodiment of the present application. The combination of open and closed portions of the exemplary embodiment of the present application provides both strength and ease of assembly.

Figure 13:
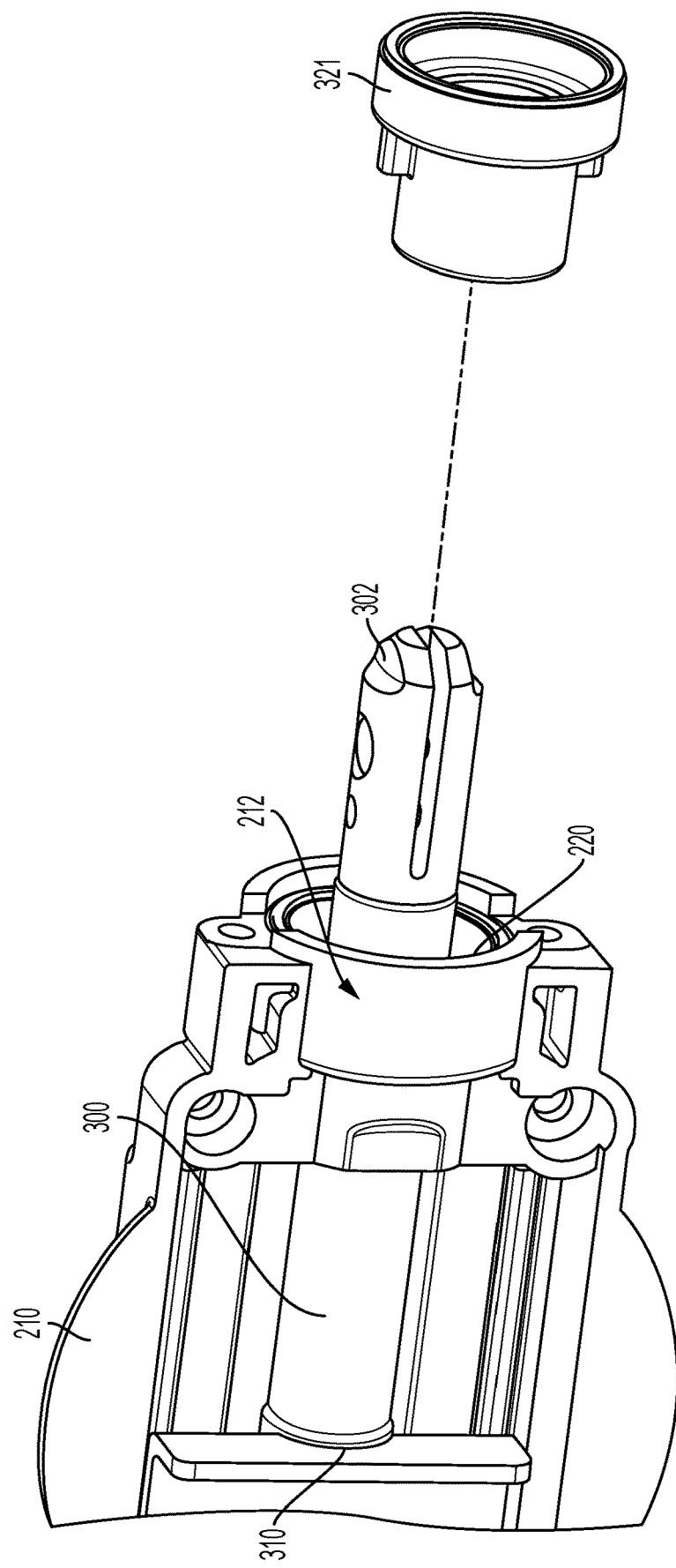
FIG. 13 is another close up view of a portion of the gearcase assembly of the exemplary embodiment during a step of assembly.
Figure 15:
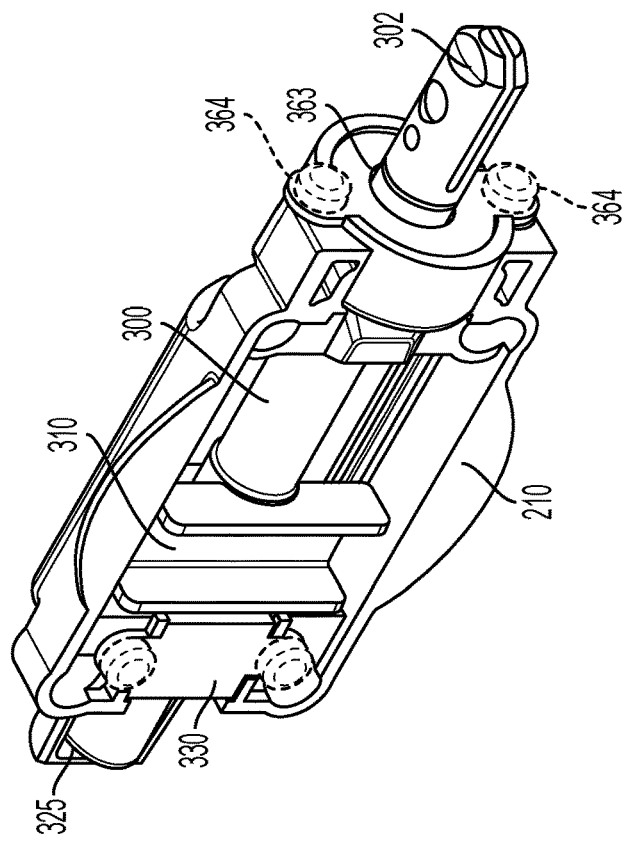
FIG. 15 is a perspective view of the gearcase assembly of the exemplary embodiment during a step of assembly.
Figure 14:
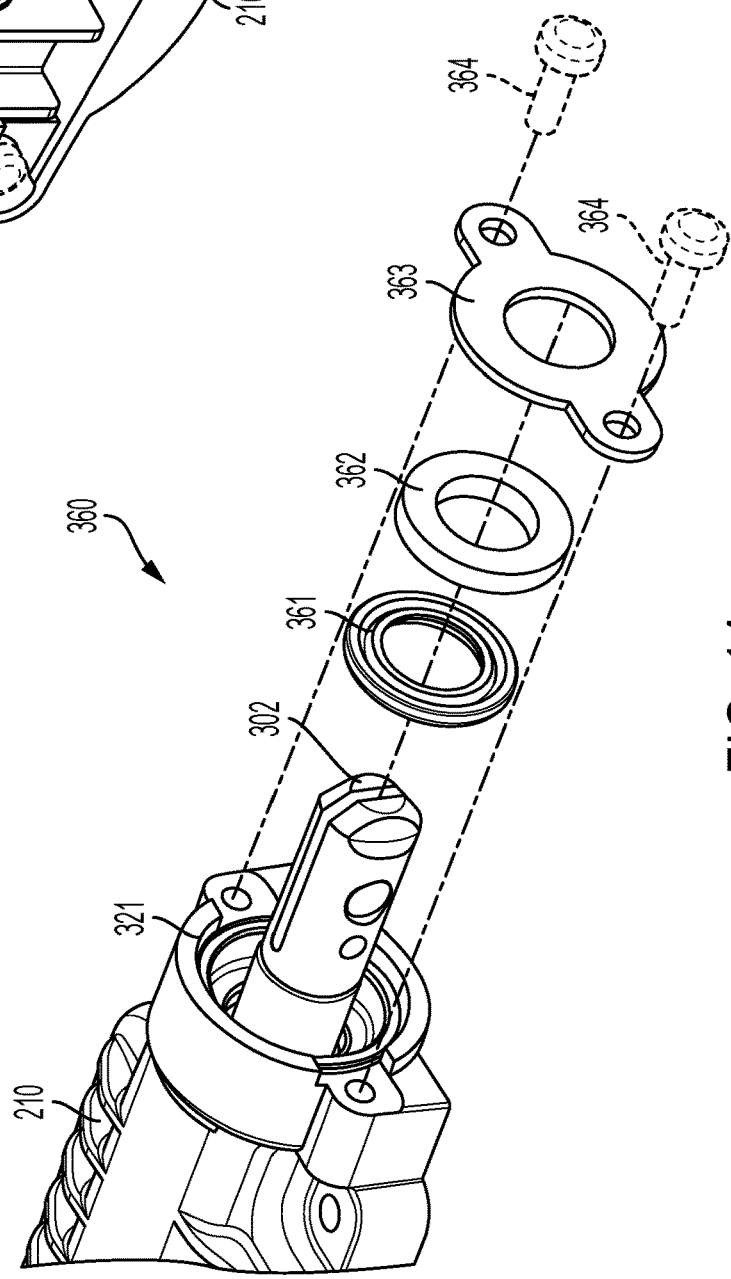
FIG. 14 is another close up view of a portion of the gearcase assembly of the exemplary embodiment during a step of assembly.

Assembly of the cover assembly will be discussed with respect to FIGS. 9 to 15. FIG. 9 illustrates the cover 210. The yoke 310 and the rear bearing 320 are assembled onto the shaft 300 before the shaft 300 is connected to the cover 210. Then, as is shown in FIG. 10, a forward end 302 (FIG. 13) of the shaft 300 is inserted into the opening 220 of the cover 210. The opening 220 is a cylindrical through hole. As shown in FIG. 13, the forward end 302 of the shaft 300 projects through the opening 220. The shaft 300 is then rotated towards the cover 210 from the position shown in FIG. 10 to the position shown in FIG. 11 such that the rear end 301 of the shaft 300 sits in the rear receiving portion 235, the rear bearing 320 sits in rear bearing receiving portion 236, and the yoke 310 is aligned in the cover 210.

As shown in FIG. 12, once the shaft 300 is in place in the cover 210 as shown in FIG. 11, the bearing cover 330 can be placed over the rear bearing 320 and screwed into place with screws 331 that project through holes in the bearing cover 330 into screwholes 232. The bearing cover 330 is shown secured in place in, for example, FIGS. 8 and 15.

As shown in FIG. 13, a forward bearing 321 can then be inserted over the forward end 302 of the shaft 300 into the opening 220 through the forward end of the opening. The forward bearing 321 is show in place in FIG. 14.

After the forward bearing 321 is assembled, a locking assembly 360 can be secured over the forward bearing 321 to lock the forward bearing 321 in place. The locking assembly 360 is shown in an exploded view in FIG. 14 and in the assembled position in FIG. 15. The locking assembly 360 includes a seal 361, felt 362 and a plate 363. Screws 364 secure the seal 361, felt 362 and plate 363. The seal 361 may be made of rubber or plastic, for example. The plate 363 may be made of metal, for example.

Figure 16:
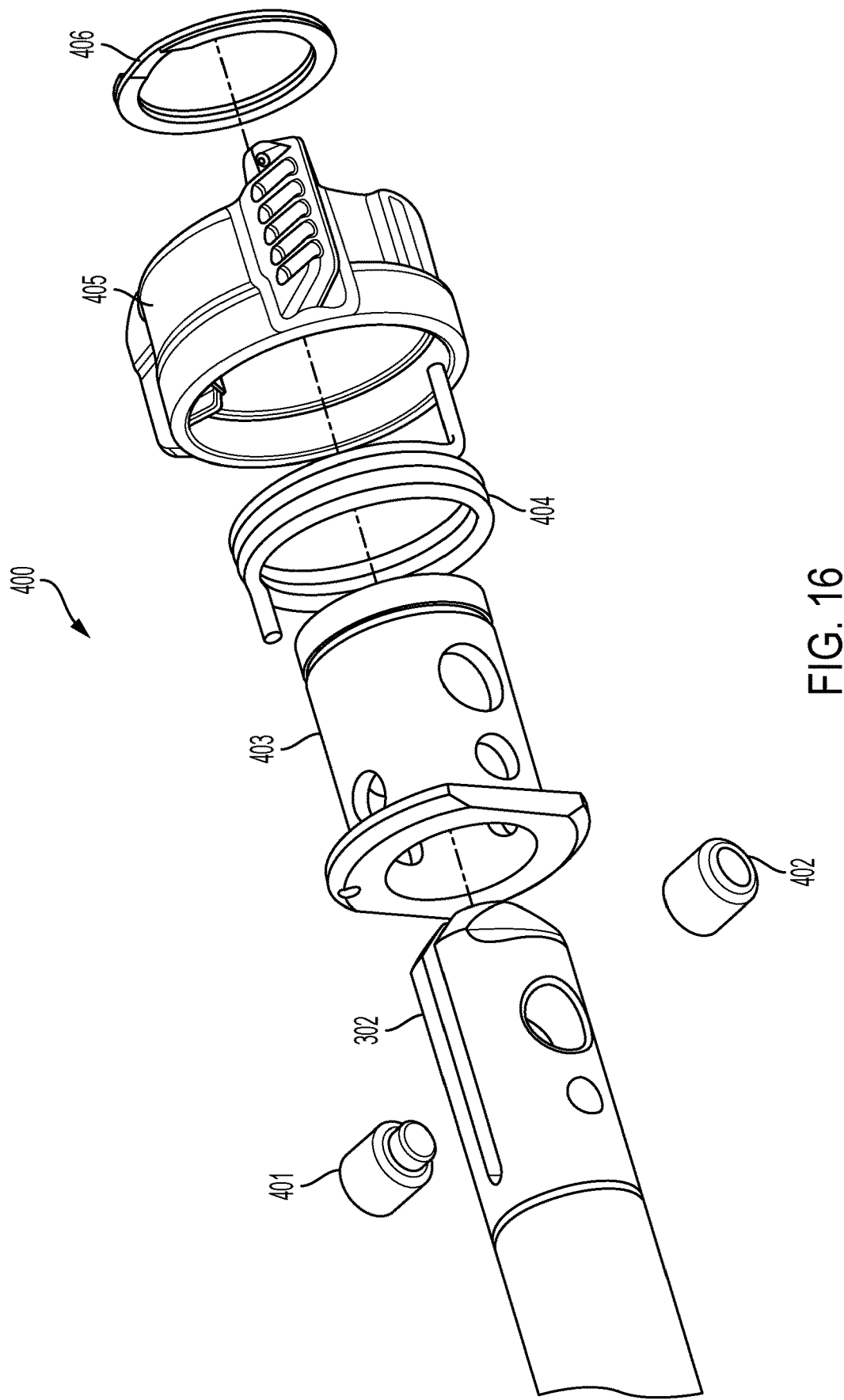
FIG. 16 is an exploded perspective view of the blade clamp of the exemplary embodiment.

After the locking assembly 360 is secured to the assembled position, the blade clamp 400 mechanism may be assembled to the forward end 302 of the shaft 300. The components of the blade clamp mechanism 400 are shown in FIG. 16, and consist of a collar rotation pin 401, blade retention pin 402, blade sleeve 403, torsion spring 404, cam collar 405 and spiral ring 406. After the blade clamp 400 is assembled, the cover assembly 200 is complete and is ready to be attached to the base 230 and motor 30.

Figure 17:
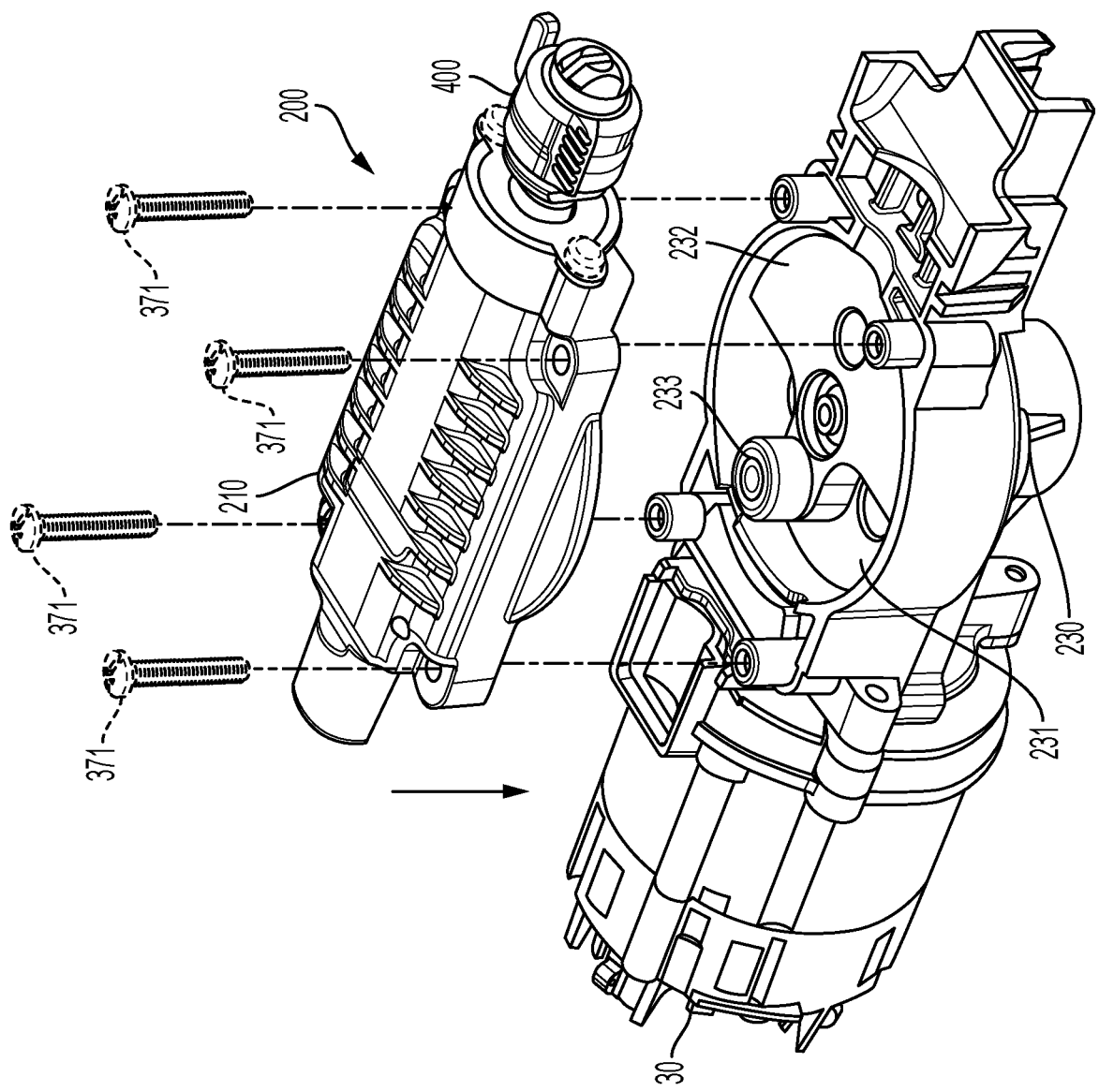
FIG. 17 is a perspective view of the exemplary embodiment during a step of assembly of the gearcase cover to the gearcase base.
Figure 18:
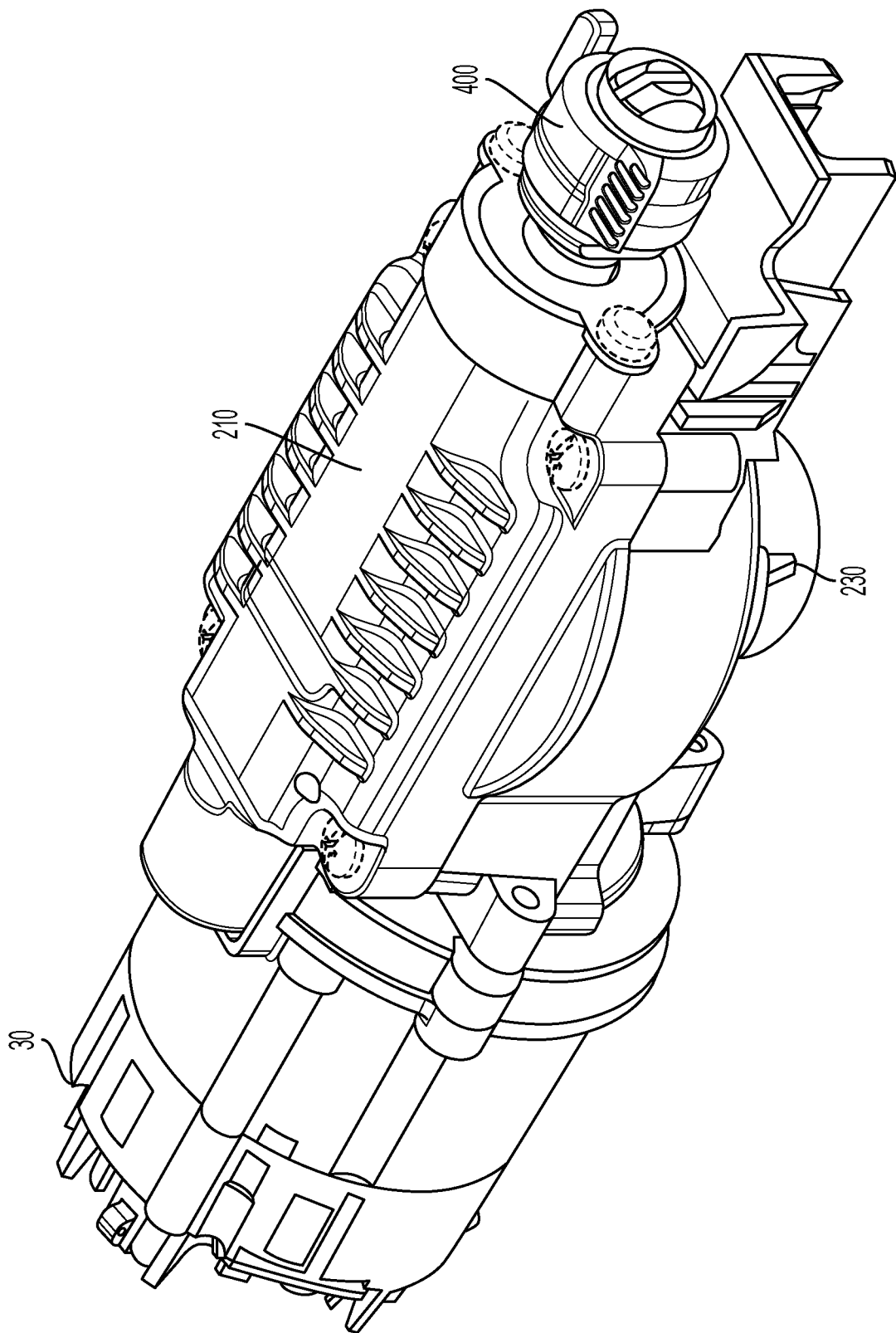
FIG. 18 is a perspective view of a gearcase and motor assembly of the exemplary embodiment.

FIG. 17 illustrates the cover assembly 200 ready to be assembled with the base 230 and FIG. 18 shows the cover assembly 200 assembled with the base 230. As shown in FIG. 17, the cover assembly 200 may be assembled over the top of the base 230 and attached to the base 230 with screws 371. FIG. 18 illustrates it as assembled.

FIG. 19 then shows that two sides of the housing 10 are screwed together to assemble the reciprocating saw 100.

Although the present technology has been described in detail for the purpose of illustration based on what is currently considered to be the most practical and preferred embodiments, it is to be understood that such detail is solely for that purpose and that the technology is not limited to the disclosed embodiments, but, on the contrary, is intended to cover modifications and equivalent arrangements that are within the spirit and scope of the appended claims. For example, it is to be understood that the present technology contemplates that, to the extent possible, one or more features of any embodiment can be combined with one or more features of any other embodiment.

Additionally, while the exemplary embodiment is described with respect to a reciprocating saw, the methods and configurations may also apply to or encompass other power tools such as other saws or cutting devices. Such other saws may include, for example, jigsaws.

What is claimed is:

1. A method of assembling a gearcase cover assembly of a reciprocating saw, the method comprising:
providing a gearcase cover with a cylindrical tube formed at a first end of the gearcase cover, the cylindrical tube having a first cylindrical opening; a receiving portion formed at a second end of the gearcase cover; and an intermediate cavity formed between the first cylindrical opening and the receiving portion;
providing a shaft with a yoke affixed to the shaft;
inserting a first end of the shaft into the first cylindrical opening such that the shaft extends through the cylindrical tube and out a second opening of the cylindrical tube opposed to the first opening;
receiving a bearing in the second opening of the cylindrical tube;
rotating the shaft such that a second end of the shaft sits in the receiving portion.

2. The method of assembling a gearcase cover assembly of a reciprocating saw according to claim 1, wherein the shaft further comprises a bearing affixed thereto;
wherein the gearcase cover includes a bearing receiving portion; and
wherein the rotating the shaft includes rotating the shaft such that the bearing sits in the bearing receiving portion.

3. The method of assembling a gearcase cover assembly of a reciprocating saw according to claim 2, further comprising securing a bearing cover to the gearcase cover.

4. The method of assembling a gearcase cover assembly of a reciprocating saw according to claim 3, wherein the securing the bearing cover to the gearcase cover causes the shaft to be secured in the gearcase cover.

5. The method of assembling a gearcase cover assembly of a reciprocating saw according to claim 4, wherein the bearing cover secures the bearing in the bearing receiving portion.

6. The method of assembling a gearcase cover assembly of a reciprocating saw according to claim 1, further comprising assembling a blade clamp assembly to the first end of the shaft.

7. The method of assembling a gearcase cover assembly of a reciprocating saw according to claim 1, further comprising forming the gearcase cover via casting.

8. The method of assembling a gearcase cover assembly of a reciprocating saw according to claim 7, wherein the gearcase cover is cast of aluminum.

9. The method of assembling a gearcase cover assembly of a reciprocating saw according to claim 1, further comprising securing a cover to an open portion of the gearcase cover.

* * * * *